United States Patent
Kim et al.

(10) Patent No.: US 8,967,671 B2
(45) Date of Patent: Mar. 3, 2015

(54) BOLTING STRUCTURE OF SUB-FRAME

(71) Applicant: Kia Motors Corporation, Seoul (KR)

(72) Inventors: Yong Dae Kim, Seoul (KR); Nam Young Lee, Gyeonggi-do (KR); Seung Hyun Kang, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 79 days.

(21) Appl. No.: 13/801,740

(22) Filed: Mar. 13, 2013

(65) Prior Publication Data

US 2014/0151991 A1    Jun. 5, 2014

(30) Foreign Application Priority Data

Dec. 3, 2012    (KR) .................. 10-2012-0139099

(51) Int. Cl.
*B62D 21/00*    (2006.01)
*B62D 21/11*    (2006.01)
*B62D 25/08*    (2006.01)

(52) U.S. Cl.
CPC .............. *B62D 21/11* (2013.01); *B62D 25/082* (2013.01)
USPC ................................. 280/785; 296/29; 296/30

(58) Field of Classification Search
CPC .............................. B62D 25/082; B62D 21/11
USPC ...................... 280/785; 296/29, 30; 180/312
See application file for complete search history.

(56) References Cited

U.S. PATENT DOCUMENTS

| | | |
|---|---|---|
| 2005/0062316 A1 | 3/2005 | Kim |
| 2011/0095568 A1 | 4/2011 | Terada et al. |

FOREIGN PATENT DOCUMENTS

| | | | |
|---|---|---|---|
| FR | 2905345 A | * 3/2008 | ............. B62D 21/11 |
| JP | 2011-088597 A | 5/2011 | |
| KR | 1019990020719 A | 3/1999 | |
| KR | 20030028634 A | 4/2003 | |
| KR | 10-2004-0073027 A | 8/2004 | |
| KR | 10-2005-0014281 A | 2/2005 | |
| KR | 10-0826473 B1 | 4/2008 | |
| KR | 20120002132 A | 1/2013 | |

* cited by examiner

*Primary Examiner* — Paul N Dickson
*Assistant Examiner* — Joselynn Y Sliteris
(74) *Attorney, Agent, or Firm* — McDermott Will & Emery LLP

(57) ABSTRACT

A bolting structure of a sub-frame includes a reinforcer mounting the sub-frame through a side member. The reinforcer includes: a reinforcing member disposed to intersect with the side member in a cross shape and bolted, together with the side member, to a lower panel; an inner pipe disposed at the side member from surfaces interfacing between the reinforcing member and the side member; an outer pipe disposed at the reinforcing member from the surfaces interfacing between the reinforcing member and the side member and inserted into the sub-frame; and a bolt bolted to the inner pipe through the outer pipe and fixing the sub-frame.

8 Claims, 6 Drawing Sheets

BOLTING STRUCTURE OF SUB-FRAME

CROSS-REFERENCE TO RELATED APPLICATION

This application claims benefit of priority to Korean Patent Application No. 10-2012-0139099, filed on Dec. 3, 2012 in the Korean Intellectual Property Office, the disclosure of which is incorporated herein in its entirety by reference.

TECHNICAL FIELD

The present disclosure relates to a bolting structure of a sub-frame, and more particularly, to a bolting structure of a sub-frame having improved rigidity by mounting the sub-frame at a side member and using an improved connection structure having a cross shape.

BACKGROUND

A bolting structure of a sub-frame includes left and right reinforcing members 20 and 30 each formed at one side and the other side of a side member 10 in a transversal direction, and inner and outer pipes 40 and 50 each formed at an inner side and an outer side of the left reinforcing member 20. The bolting structure further includes a support bracket 70 formed at the inner side of the left reinforcing member 20 and supporting the inner pipe 40, and a bolt 60 bolted to the inner pipe 40 through the outer pipe 50 in a state in which a sub-frame (not shown) is inserted into the outer pipe 50, thereby bolting the sub-frame, as shown in FIGS. 1 and 2.

Here, the inner pipe 40 is supported by the support bracket 70 to thereby increase rigidity of the inner pipe 40. That is, the bolting structure of a sub-frame according fixes the sub-frame through the left reinforcing member 20 of which one end is supported by the side member 10.

However, in the bolting structure of a sub-frame, the left reinforcing member 20, to which the sub-frame is fixed, has weak rigidities in a front and rear direction and in a left and right direction, and is deformable at the time of having a transversal load applied thereto.

Furthermore, a vibration load transferred through the sub-frame is transferred to a vehicle body through the reinforcing members, and the vibration load transferred to the vehicle body generates noise such as road noise, booming noise, and acceleration penetration sound in a vehicle.

SUMMARY

Accordingly, the present disclosure has been made to solve the above-mentioned problems occurring in the prior art while maintaining advantages achieved by the prior art intact.

A need exists for providing a bolting structure of a sub-frame capable of increasing rigidity of the sub-frame by bolting the sub-frame to a side member using a reinforcing member fixing the sub-frame and capable of securing stable supporting rigidity and suppressing generation of noise such as road noise, booming noise, and acceleration penetration sound in a vehicle by disposing the reinforcing member in a cross shape with respect to the side member.

One aspect of the present disclosure provides a bolting structure of a sub-frame including: a reinforcer mounting the sub-frame through a side member. The reinforcer includes: a reinforcing member disposed to intersect with the side member in a cross shape and bolted, together with the side member, to a lower panel; an inner pipe disposed at the side member from surfaces interfacing between the reinforcing member and the side member; an outer pipe disposed at the reinforcing member from the surfaces interfacing between the reinforcing member and the side member and inserted into the sub-frame; and a bolt bolted to the inner pipe through the outer pipe and fixing the sub-frame.

The reinforcing member may be provided with ribs for increasing rigidity.

The ribs may extend from the center of the reinforcing member at which the side member is positioned toward both side end portions thereof.

An inner side of the side member may be provided with a support bracket supporting the inner pipe.

The support bracket may include a lower bracket having both side end portions bent so as to be supported by an inner side surface of the side member and having the inner pipe supported by the center thereof while penetrating through the center thereof and an upper bracket extending at the inner side of the side member in a length direction of the side member and having the inner pipe supported thereby while penetrating therethrough.

The inner pipe may be welded to the support bracket in a state in which the inner pipe penetrates through the support bracket.

The inner pipe may be welded to an inner side surface of the side member.

Front and rear and left and right ends of the reinforcing member may be provided with flanges, which are welded to a bottom surface of a vehicle body.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
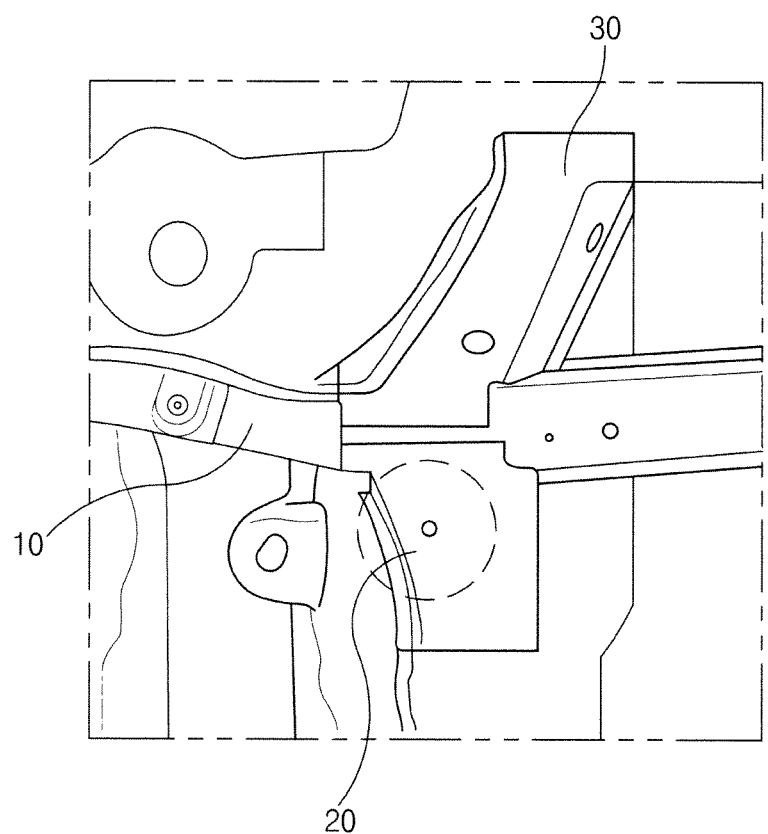
FIG. 1 is a view showing a bolting structure of a sub-frame according to the related art.
Figure 2:
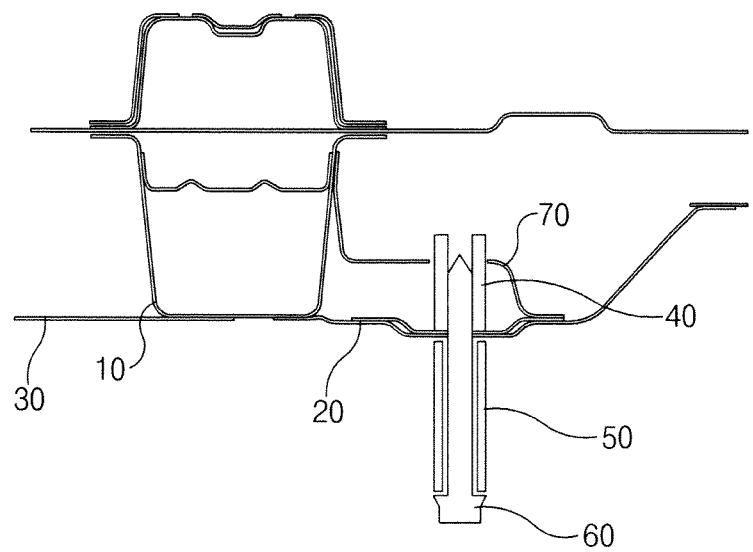
FIG. 2 is a cross-sectional view showing the bolting structure of a sub-frame according to the related art.

A bolting structure of a sub-frame according to an exemplary embodiment of the present disclosure may secure stable supporting force of the sub-frame in a front and rear direction and in a left and right direction by bolting a reinforcing means to a side member so as to intersect with the side member in a cross shape and then supporting the sub-frame through the reinforcing unit and the side member bolted to each other.

Hereinafter, exemplary embodiments of the present disclosure will be described in detail with reference to the accompanying drawings so that they can be easily practiced by those skilled in the art to which the present invention concept pertains. However, the present disclosure may be modified in various different ways and is not limited to the exemplary embodiments provided in the present description. In the accompanying drawings, portions unrelated to the description will be omitted in order to obviously describe the present disclosure, and similar reference numerals will be used to describe similar portions throughout the present specification.

Figure 3:
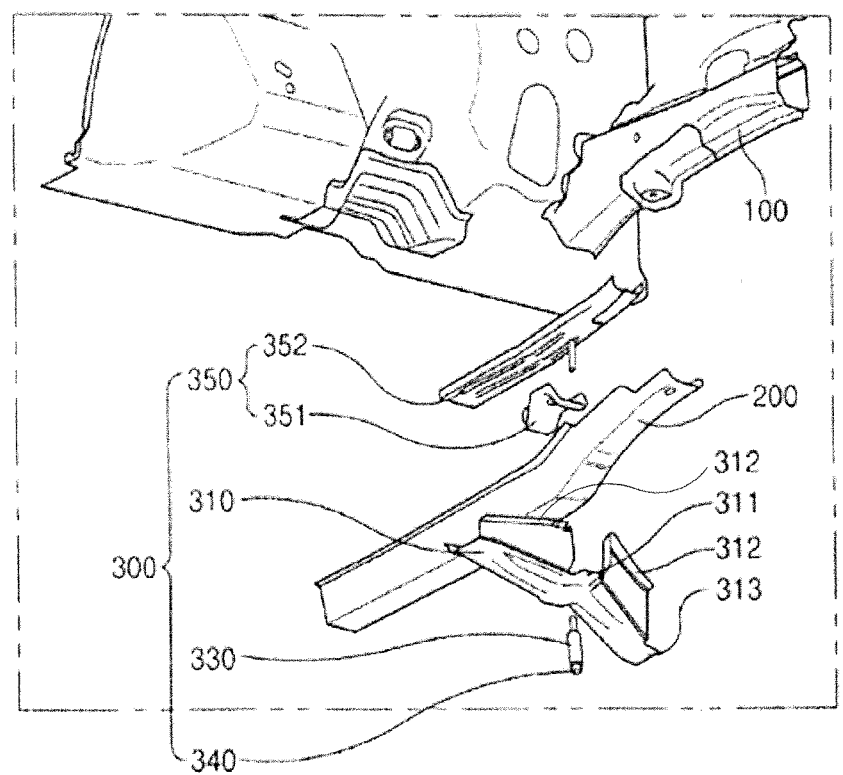
FIG. 3 is a perspective view showing a bolting structure of a sub-frame according to an exemplary embodiment of the present disclosure.

The bolting structure of a sub-frame according to the exemplary embodiment of the present disclosure includes side members 100 each disposed at the left and the right of a front lower portion of a vehicle body in a length direction of a vehicle, and a sub-frame 200 disposed between the left and right side members in a width direction of the vehicle and supporting main components such as an engine, a transmission, and the like. The bolting structure further includes a reinforcer 300 mounting both side end portions of the sub-frame 200 to the left and right side members, respectively, to increase supporting force, as shown in FIG. 3.

Here, the reinforcer 300 fixes the sub-frame 200 to the vehicle body using a supporting force of the side members 100 by using a supporting force of the sub-frame 200 in a front and rear direction through the side members 100 and a supporting force of the sub-frame 200 in a left and right direction and a transversal direction through a fixing means.

Figure 4:
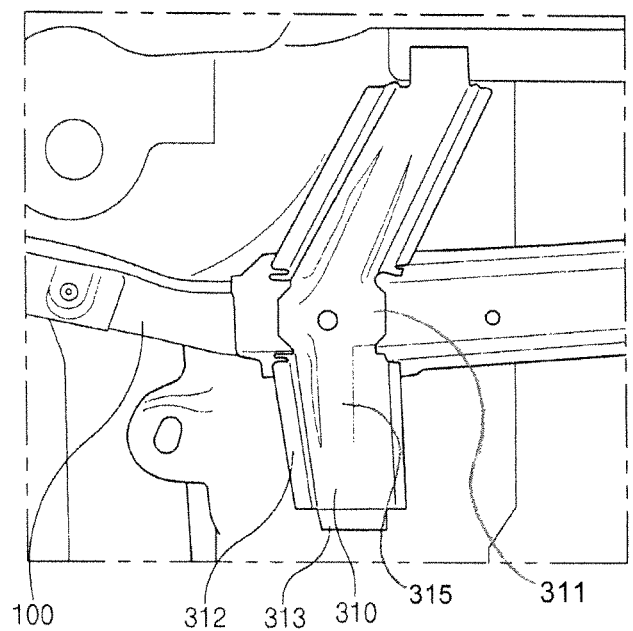
FIG. 4 is a front view showing the bolting structure of a sub-frame according to the exemplary embodiment of the present disclosure.
Figure 5:
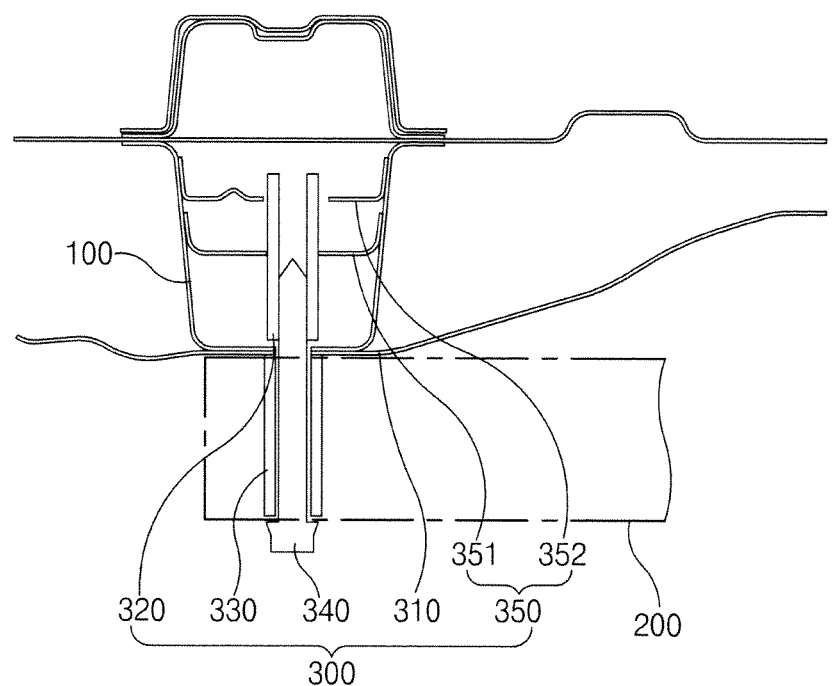
FIG. 5 is a cross-sectional view showing the bolting structure of a sub-frame according to the exemplary embodiment of the present disclosure.

That is, the reinforcer 300 is mounted at one side of a lower portion of the side member 100 in a state in which it has an end portion of the sub-frame 200. The reinforcer 300 includes a reinforcing member 310, which intersects with the side member 100 in a cross shape and is bolted, together with the side member 100, to a lower panel, an inner pipe 320 disposed in an inner side of the side member 100 extending from surfaces interfacing between the reinforcing member 310 and the side member 100, and an outer pipe 330 disposed at the reinforcing member 310 extending from the surface interfacing between the reinforcing member 310 and the side member 100 and inserted into the sub-frame 200. The reinforcer 300 further includes a bolt 340 bolted to the inner pipe 320 through the outer pipe 330 and fixing the sub-frame 200, and a support bracket 350 disposed at the inner side of the side member 100 and supporting the inner pipe 320, as shown in FIGS. 4 and 5.

In the reinforcing member 310, which increases the supporting force of the sub-frame 200 in the left and right direction, the approximate center is disposed to intersect with one side of a lower surface of the side member 100 in a cross shape, and flanges 311 formed at both sides of the center are welded to the side member 100 to increase the coupling force and the supporting force between the reinforcing member 310 and the side member 100. Therefore, both of the reinforcing member 310 and the side member 100 absorb impact transferred from the sub-frame 200 to maintain stable supporting force.

In addition, both side portions of the reinforcing member 310 are provided with vertical surfaces supported by a bottom surface 101 of the vehicle body, respectively, and the vertical surfaces are provided with flanges 312, respectively. The flanges 312 are welded to the bottom surface of the vehicle body to increase supporting force of both side surfaces of the reinforcing member 310 and allow stable supporting force to be secured through the reinforcing member 310 even though a load is applied to the sub-frame 200 in a transversal direction.

In addition, both end portions of the reinforcing member 310 are provided with flanges 313, respectively, which are welded to a side sill 102 or the bottom surface 101 of the vehicle body to further increase the supporting force of the reinforcing member 310.

Meanwhile, the reinforcing member 310 may be provided with ribs 315 for increasing rigidity of the reinforcing member. The ribs 315 extend from the center of the reinforcing member 310 having the side member 100 positioned on a vertical line thereof toward both side end portions thereof to uniformly reinforce both side end portions of the reinforcing member 310 and increase rigidity with respect to the side member 100.

As described above, the reinforcing member 310 is disposed in the cross shape with respect to the side member 100 and all end portions thereof are welded to the side member 100 or the bottom surface of the vehicle body, thereby making it possible to secure firm supporting force. Further, the reinforcing member 310 is further provided with the ribs 315, thereby making it possible to secure more stable supporting force.

The inner pipe 320 and the outer pipe 330 are disposed at the side member 100 and the reinforcing member 310, respectively, extending from the surfaces interfacing between the reinforcing member 310 and the side member 100 so as to correspond to each other, thereby increasing fixing force of the bolt 340 for fixing the sub-frame 200.

Here, the inner pipe 320 is welded to a bottom surface of an inner side of the side member 100, such that fixing force of the inner pipe 320 is increased.

The bolt 340 fixes the sub-frame 200, which is inserted into the outer pipe 330, and is bolted from the outer pipe 330 up to the inner pipe 320 to support a lower surface of the sub-frame 200, which is inserted into the outer pipe 330. This thereby fixes the sub-frame 200 so as not to be separated.

The support bracket 350, which increases supporting force of the inner pipe 320, includes a lower bracket 351 and an upper bracket 352 disposed in a multi-stage form in the inner side of the side member 100 and supporting the inner pipe 320 in a multi-state form.

The lower bracket 351 has both side end portions bent so as to be supported by the bottom surface of the inner side of the side member 100 and both side portions welded to an inner wall of the side member 100, and has the inner pipe 320 supported by a central surface thereof while penetrating through the central surface thereof. Here, surfaces interfacing between the inner pipe 320 and the lower bracket 351 are welded to each other, such that supporting force is increased.

The upper bracket 352 is positioned over the lower bracket 351, and extends in the inner side of the side member 100 in a length direction of the side member 100. The upper bracket 352 has the inner pipe 320 supported thereby while penetrating therethrough. Here, surfaces interfacing between the inner pipe 320 and the upper bracket 352 are welded to each other, such that supporting force is increased.

That is, the support bracket 350 increases the supporting force of the inner pipe 320 through the lower bracket 351 and supports, together with the side member 100, a load applied to the sub-frame 200 in a front and rear direction while increasing the supporting force of the inner pipe 320 through the upper bracket 352.

Figure 6:
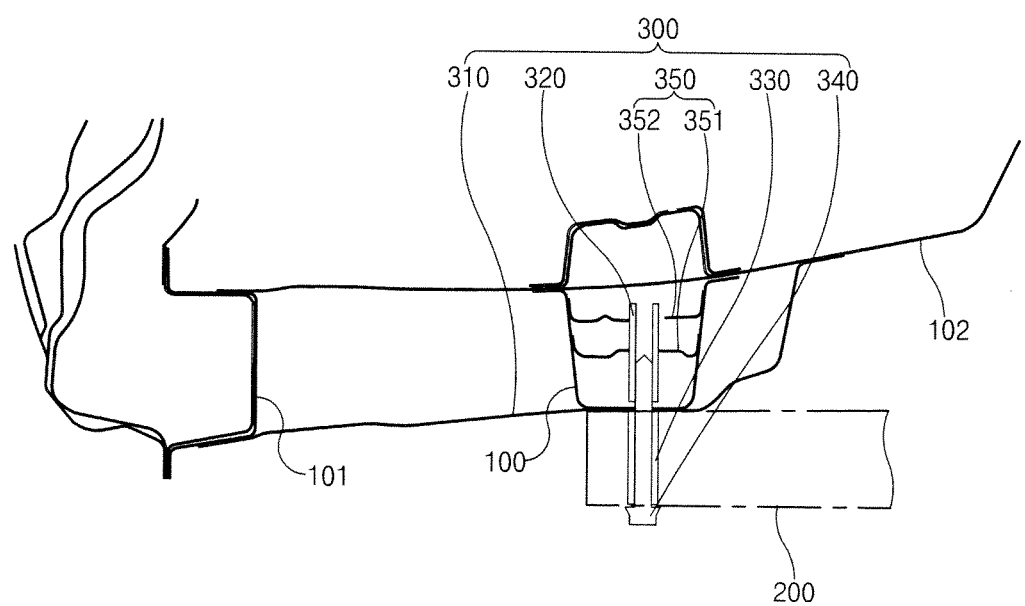
FIG. 6 is a cross-sectional view showing a welded state of the bolting structure of a sub-frame according to the exemplary embodiment of the present disclosure.

In the bolting structure of a sub-frame having the above-mentioned configuration, as shown in FIG. 6, when loads in a front and rear direction, in a left and right direction, and in a transversal direction are applied to the sub-frame 200, the load in the front and rear direction is supported by the side member 100 and the upper bracket 352, the load in the left and right direction is supported by the reinforcing member 310, and the load in the transversal direction is supported by the entirely welded reinforcing member 310, thereby making it possible to secure stable supporting force.

Therefore, with the bolting structure of a sub-frame according to the exemplary embodiment of the present disclosure, the sub-frame 200 moves to the lower surface of the side member 100 and is then bolted to the side member 100 through the reinforcing means 300 bolted to the side member 100 so as to intersect with the side member 100 in the cross shape, such that the sub-frame 200 may be more stably supported. In addition, rigidity of entry points of the vehicle body is improved, such that generation of vibration, booming noise, and road noise in the vehicle may be suppressed.

According to the exemplary embodiment, the bolted position of the sub-frame is changed to a portion at which the reinforcing member and the side member overlap with each other and the reinforcing member and the side member are disposed to intersect with each other in the cross shape, such that the front and rear of the sub-frame is supported by the side member and the left and right thereof is supported by the reinforcing member, thereby making it possible to secure the stable supporting force and suppress the generation of the noise such as the road noise, the booming noise, and the acceleration penetration sound in the vehicle.

It should be interpreted that the scope of the present inventive concept is defined by the following claims rather than the above-mentioned detailed description and all modifications or alterations deduced from the meaning, the scope, and equivalences of the claims are included in the scope of the present inventive concept.

What is claimed is:

1. A bolting structure of a sub-frame comprising:
   a reinforcer mounting the sub-frame through a side member,
   wherein the reinforcer includes:
   a reinforcing member disposed to intersect with the side member in a cross shape and bolted together with the side member;
   an inner pipe disposed at the side member extending from surfaces interfacing between the reinforcing member and the side member;
   an outer pipe disposed at the reinforcing member extending from the surface interfacing between the reinforcing member and the side member and inserted into the sub-frame; and
   a bolt bolted to the inner pipe through the outer pipe and fixing the sub-frame.

2. The bolting structure of a sub-frame according to claim 1, wherein the reinforcer is provided with ribs for increasing rigidity.

3. The bolting structure of a sub-frame according to claim 2, wherein the ribs extend from a center of the reinforcing member at which the side member is positioned toward both side end portions thereof.

4. The bolting structure of a sub-frame according to claim 1, wherein an inner side of the side member is provided with a support bracket supporting the inner pipe.

5. The bolting structure of a sub-frame according to claim 4, wherein the support bracket includes a lower bracket having both side end portions bent so as to be supported by an inner side surface of the side member and having the inner pipe supported by a center thereof while penetrating through the center thereof and an upper bracket extending in the inner side of the side member in a length direction of the side member and having the inner pipe supported thereby while penetrating therethrough.

6. The bolting structure of a sub-frame according to claim 4, wherein the inner pipe is welded to the support bracket in a state in which the inner pipe penetrates through the support bracket.

7. The bolting structure of a sub-frame according to claim 1, wherein the inner pipe is welded to an inner side surface of the side member.

8. The bolting structure of a sub-frame according to claim 1, wherein front and rear and left and right ends of the reinforcing member are provided with flanges, which are welded to a bottom surface of a vehicle body.

* * * * *